United States Patent
Kubota et al.

(10) Patent No.: US 9,964,158 B2
(45) Date of Patent: May 8, 2018

(54) DAMPER DISK ASSEMBLY

(71) Applicant: EXEDY Corporation, Neyagawa-shi, Osaka (JP)

(72) Inventors: Yoshitaka Kubota, Neyagawa (JP); Kazuki Hashimoto, Neyagawa (JP); Ryota Matsumura, Neyagawa (JP)

(73) Assignee: Exedy Corporation, Neyagawa-shi, Osaka (JP)

( * ) Notice: Subject to any disclaimer, the term of this patent is extended or adjusted under 35 U.S.C. 154(b) by 134 days.

(21) Appl. No.: 14/914,743

(22) PCT Filed: Aug. 29, 2014

(86) PCT No.: PCT/JP2014/072782
§ 371 (c)(1),
(2) Date: Feb. 26, 2016

(87) PCT Pub. No.: WO2015/033873
PCT Pub. Date: Mar. 12, 2015

(65) Prior Publication Data
US 2016/0208862 A1      Jul. 21, 2016

(30) Foreign Application Priority Data
Sep. 3, 2013    (JP) ................................ 2013-182562

(51) Int. Cl.
*F16D 3/12*      (2006.01)
*F16F 15/134*    (2006.01)
*F16D 13/64*     (2006.01)

(52) U.S. Cl.
CPC ............... *F16D 3/12* (2013.01); *F16D 13/64* (2013.01); *F16F 15/134* (2013.01); *F16D 2300/22* (2013.01)

(58) Field of Classification Search
CPC ........ F16D 3/12; F16D 13/64; F16D 2300/22; F16F 15/134
(Continued)

(56) References Cited

U.S. PATENT DOCUMENTS 4,969,855 A * 11/1990 Graton .............. F16F 15/12326
                                              192/213.22 X
5,145,463 A    9/1992 Bather et al.
(Continued)

FOREIGN PATENT DOCUMENTS

CN        101680493 A     3/2010
CN        102425617 A     4/2012
(Continued)

OTHER PUBLICATIONS

International Search Report for Int'l App. No. PCT/JP2014/072782, dated Dec. 2, 2014, 1-2.

*Primary Examiner* — Gregory J Binda
(74) *Attorney, Agent, or Firm* — United IP Counselors, LLC

(57) ABSTRACT

A damper disc assembly includes first and second input plates, an output unit, a high stiffness damper unit, and first and second low stiffness damper units. The output unit includes an input-side member and an output-side member disposed rotatably relative to each other. The high stiffness damper unit elastically couples the input-side member and the first and second input plates in a rotational direction and is actuated in a high torsion angular range of torsional characteristics. The first and second low stiffness damper units elastically couple the input-side member and the output-side member and are actuated in a low torsion angular range of the torsional characteristics. The second low stiffness damper unit is actuated later than actuation of the first low stiffness damper unit.

6 Claims, 11 Drawing Sheets

(58) Field of Classification Search
USPC .......................... 464/68.4, 68.41, 68.7, 68.8; 192/213.1–213.12
See application file for complete search history.

(56) References Cited

U.S. PATENT DOCUMENTS

| | | | |
|---|---|---|---|
| 6,029,793 | A | 2/2000 | Tanaka et al. |
| 2010/0130289 | A1 | 5/2010 | Uehara et al. |
| 2017/0002870 | A1* | 1/2017 | Kubota .................. F16D 13/64 |

FOREIGN PATENT DOCUMENTS

| | | | |
|---|---|---|---|
| CN | 102425618 | A | 4/2012 |
| DE | 1400371 | A1 | 10/1968 |
| DE | 3919948 | A1 | 12/1989 |
| DE | 19825289 | A1 | 12/1998 |
| DE | 19857110 | A1 | 6/1999 |
| FR | 2633360 | A1 | 12/1989 |
| FR | 2764354 | A1 | 12/1998 |
| GB | 2220249 | A | 1/1990 |
| JP | H0242213 | A | 2/1990 |
| JP | H10339355 | A | 12/1998 |
| JP | H11173381 | A | 6/1999 |
| JP | H11280784 | A | 10/1999 |
| JP | 2009019746 | A | 1/2009 |
| WO | 2008149743 | A1 | 12/2008 |

* cited by examiner

DAMPER DISK ASSEMBLY

CROSS-REFERENCE TO RELATED APPLICATIONS

This application is the U.S. National Phase of PCT International Application No. PCT/JP2014/072782, filed on Aug. 29, 2014. That application claims priority to Japanese Patent Application No. 2013-182562, filed Sep. 3, 2013. The contents of both applications are herein incorporated by reference in their entirety.

BACKGROUND

Technical Field

The present invention relates to a damper disc assembly, particularly to a damper disc assembly configured to attenuate variation in torque inputted thereto from an engine and transmit the torque toward a transmission.

Background Art

In general, noises and vibrations of vehicles include noises in idling, noises in traveling and tip-in/tip-out (low frequency vibrations). Damper disc assemblies are provided for inhibiting the aforementioned noises and vibrations.

In torsional characteristics of a damper disc assembly, a low torsion angular range relates to noises in idling, and a low torsional stiffness is preferable in the low torsion angular range. On the other hand, to countermeasure tip-in/tip-out, the torsional characteristics are required to have a highest possible stiffness.

To solve the aforementioned problems, there has been produced a type of damper disc assembly using two kinds of springs so as to implement two-stage torsional characteristics. This device is configured to suppress low both torsional stiffness and hysteresis torque in the first stage (low torsion angular range) of the torsional characteristics so as to inhibit noises in idling. Additionally, this device is configured to set both torsional stiffness and hysteresis torque to be high in the second stage (high torsion angular range) of the torsional characteristics so as to attenuate vibrations of tip-in/tip-out.

Moreover, there has been also produced a type of device that when minute vibrations attributed to, for instance, variation in engine combustion are inputted in the high torsion angular range of the torsional characteristics, a low hysteresis torque is configured to be generated without generating a high hysteresis torque so as to attenuate the minute vibrations (see e.g., Japan Laid-open Patent Application Publication NO. H11-280784).

Furthermore, there has been also proposed a construction of a damper disc assembly obtained by dividing a spline hub in a well-known damper disc assembly into a hub and a flange so as to particularly widen the first stage low torsion angular range as much as possible (see e.g., Japan Laid-open Patent Application Publication No. H10-339355). In this construction, the divided hub and flange are coupled by a sub damper unit in a rotational direction. Additionally, the sub damper unit is disposed laterally to the flange.

SUMMARY

In the damper disc assembly described in Japan Laid-open Patent Application Publication No. H10-339355, the sub damper unit is disposed laterally to the flange so as to widen the low torsion angular range. Therefore, noises in idling can be effectively inhibited.

However, the sub damper unit is disposed on the inner peripheral side of the main damper unit. Hence, the circumferential space for disposing the sub damper unit is small, and this imposes a limitation on widening the low torsion angular range. Therefore, chances are that a torque required in idling mainly performed in the low torsion angular range cannot be obtained depending on the specifications of vehicles.

It is an object of the present invention to effectively attenuate noises in idling and vibrations by particularly widening the low torsion angular range and to obtain a torque required in idling.

Solution to Problems

A damper disc assembly according to a first aspect of the present invention is configured to attenuate variation in torque inputted thereto from an engine and transmit the torque toward a transmission. The damper disc assembly includes first and second input plates, an output unit, a high stiffness damper unit, a first low stiffness damper unit and a second low stiffness damper unit.

The first and second input plates are disposed axially in opposition to each other and are fixed to each other. The first and second input plates are members to which the torque is inputted from the engine. The output unit includes an input-side member and an output-side member. The input-side member and the output-side member are disposed rotatably relative to the first and second input plates, and are also disposed rotatably relatively to each other. Additionally, the input-side member is disposed axially between the first and second input plates, and the output-side member is coupleable to the transmission. The high stiffness damper unit elastically couples the input-side member and the first and second input plates in a rotational direction, and is configured to be actuated in a high torsion angular range of torsional characteristics. The first low stiffness damper unit elastically couples the input-side member and the output-side member in the rotational direction, and is disposed axially between the first input plate and the input-side member on an inner peripheral side of the high stiffness damper unit. The first low stiffness damper unit is configured to be actuated in a low torsion angular range of the torsional characteristics, and has a lower stiffness than the high stiffness damper unit. The second low stiffness damper unit elastically couples the input-side member and the output-side member in the rotational direction, and is disposed axially between the second input plate and the input-side member on the inner peripheral side of the high stiffness damper unit. The second low stiffness damper unit is configured to be actuated later than actuation of the first low stiffness damper unit in the low torsion angular range of the torsional characteristics, and has a lower stiffness than the high stiffness damper unit.

When a torque is inputted to the damper disc assembly, the first low stiffness damper unit is configured to be actuated in the low torsion angular range of the torsional characteristics, and next, the second low stiffness damper unit is configured to be actuated in a delayed timing. Then, the high stiffness damper unit is configured to be actuated in the high torsion angular range.

Here, the two low stiffness damper units are disposed axially on the both sides of the input-side member composing a part of the output unit. Additionally, the first low stiffness damper unit is firstly configured to be actuated in the low torsion angular range, and next, the second low stiffness damper unit is configured to be actuated in the delayed timing. Therefore, the low torsion angular range can be widened as much as possible. Moreover, two-stage characteristics can be implemented by the two low stiffness damper units, and a high torque can be obtained in the low torsion angular range.

A damper disc assembly according to a second aspect of the present invention relates to the damper disc assembly according to the first aspect, and wherein the output-side member is a hub coupleable to the transmission. Additionally, the input-side member is a flange that radially extends on an outer peripheral side of the hub and is rotatable relatively to the hub within a predetermined angular range.

A damper disc assembly according to a third aspect of the present invention relates to the damper disc assembly according to the second aspect, and wherein the high stiffness damper unit elastically couples the flange and the first and second input plates in the rotational direction. Each of the first and second low stiffness damper units elastically couples the flange and the hub in the rotational direction.

A damper disc assembly according to a fourth aspect of the present invention relates to the damper disc assembly according to the third aspect, and wherein each of the first and second low stiffness damper units includes a pair of holder plates, a drive plate and an elastic member. The pair of holder plates is engaged with the flange whereby the torque is inputted thereto from the flange. The drive plate is disposed axially between the pair of holder plates, and is engaged with the hub whereby the torque is outputted therefrom to the hub. The elastic member elastically couples the drive plate and the pair of holder plates in the rotational direction.

A damper disc assembly according to a fifth aspect of the present invention relates to the damper disc assembly according to any of the first to fourth aspects, and further includes a first hysteresis torque generating mechanism and a second hysteresis torque generating mechanism. The first hysteresis torque generating mechanism is configured to generate a first hysteresis torque in the actuation range of the first low stiffness damper unit and a lower torsion angular part of the actuation range of the second low stiffness damper unit. The second hysteresis torque generating mechanism is configured to generate a second hysteresis torque higher than the first hysteresis torque in a higher torsion angular part of the actuation range of the second low stiffness damper unit.

A damper disc assembly according to a sixth aspect of the present invention relates to the damper disc assembly according to the fifth aspect, and wherein the second hysteresis torque generating mechanism is further configured to generate the second hysteresis torque in the actuation range for the high stiffness damper unit.

A damper disc assembly according to a seventh aspect of the present invention relates to the damper disc assembly according to the fifth or sixth aspect, and further includes an intermediate hysteresis torque generating mechanism configured to generate an intermediate hysteresis torque, which is higher than the first hysteresis torque and lower than the second hysteresis torque, in the lower torsion angular part of the actuation range of the second low stiffness damper unit.

According to the present invention as described above, noises in idling and vibrations can be attenuated by widening the low torsion angular range as much as possible, and simultaneously, a high torque can be obtained in idling corresponding to the low torsion angular range.

DETAILED DESCRIPTION OF EMBODIMENTS

[Entire Construction]

Figure 1:
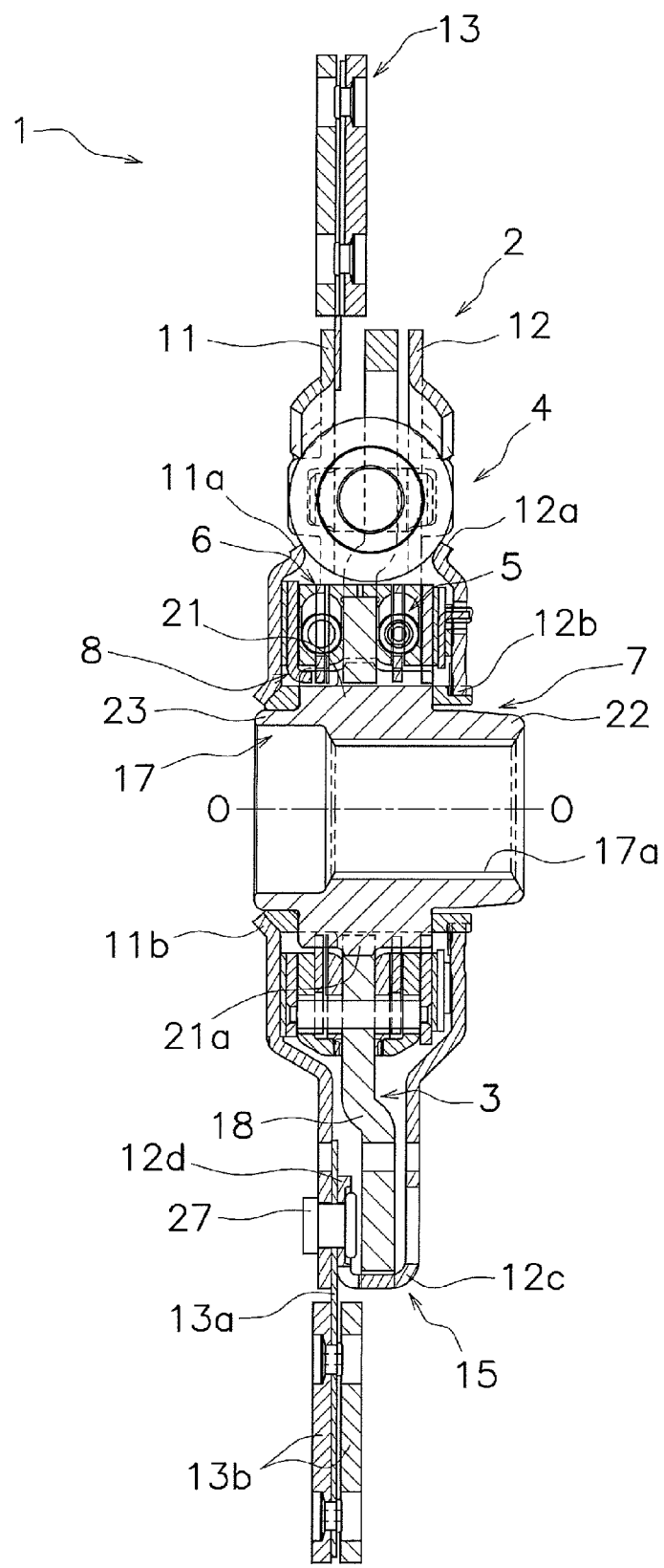
FIG. 1 is a cross-sectional view of a clutch disc assembly according to an exemplary embodiment of the present invention.
Figure 2:
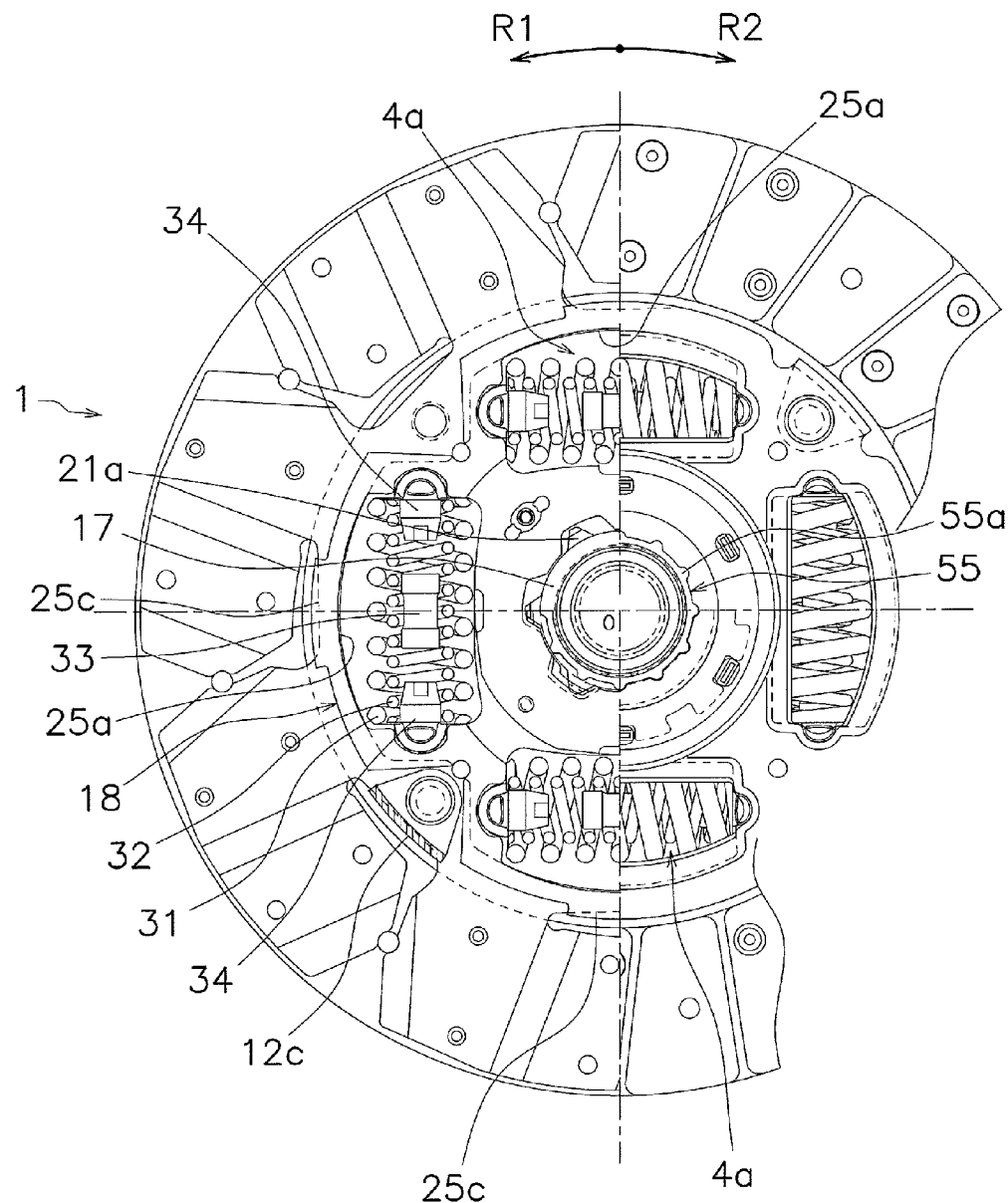
FIG. 2 is a partial front view of FIG. 1.

FIGS. 1 and 2 show a clutch disc assembly 1 including a damper disc assembly according to an exemplary embodiment of the present invention. FIG. 1 is a cross-sectional view of the clutch disc assembly 1, whereas FIG. 2 is a front view of the clutch disc assembly 1. The clutch disc assembly 1 is used as a clutch device for a vehicle, and has a clutch function and a damper function. In FIG. 1, line O-O indicates the rotational axis of the clutch disc assembly 1, i.e., a rotational center line. Additionally, in FIG. 1, an engine and a flywheel (not shown in the drawing) are disposed on the left side whereas a transmission (not shown in the drawing) is disposed on the right side. Moreover, in FIG. 2, an R1 side indicates a rotation-directional drive side (positive side) of the clutch disc assembly 1 whereas an R2 side indicates the opposite side (negative side) to the rotation-directional drive side.

Figure 3:
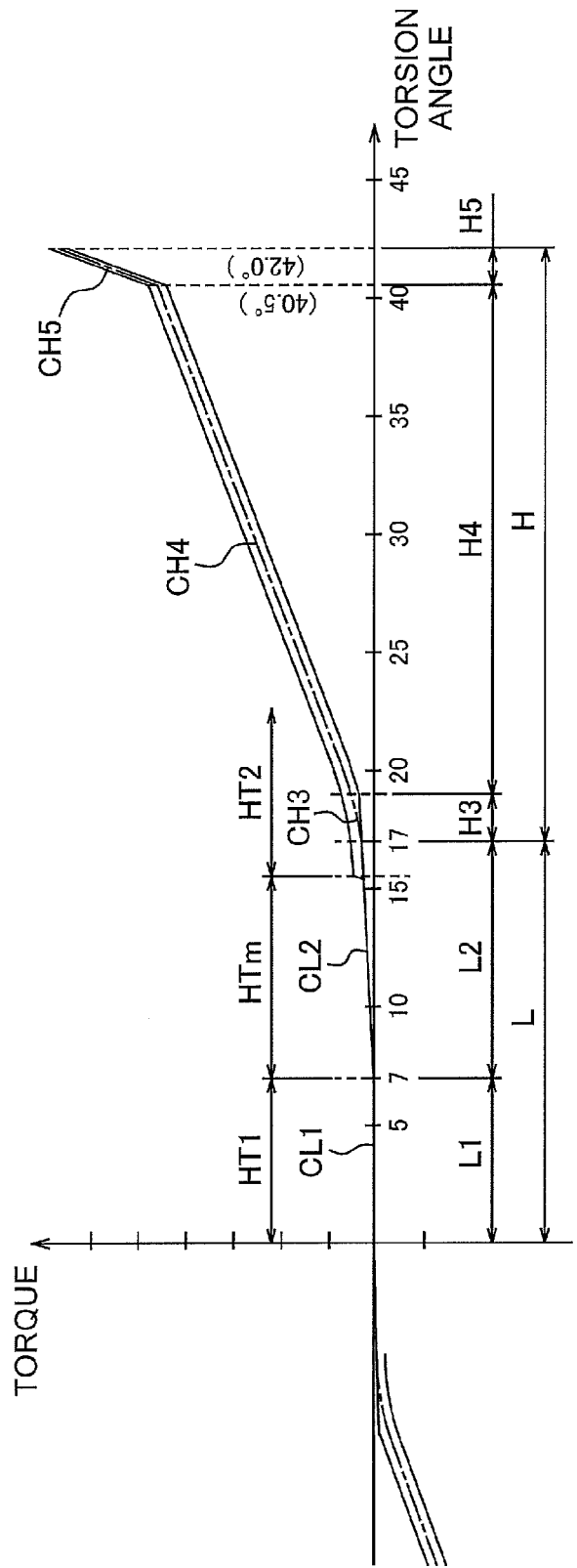
FIG. 3 is a diagram showing an example of torsional characteristics.

The clutch disc assembly 1 mainly includes an input-side plate 2, an output unit 3, a high stiffness damper unit 4, a first low stiffness damper unit 5, a second low stiffness damper unit 6, a first hysteresis torque generating mechanism 7, a second hysteresis torque generating mechanism 8 and an intermediate hysteresis torque generating mechanism 9. Additionally, the clutch disc assembly 1 has torsional characteristics as shown in FIG. 3 (only positive-side torsional characteristics are herein explained). In short, the clutch disc assembly 1 has a characteristic CL1 in a first stage angular range L1 of a low torsion angular range L (of e.g., 0-17 degrees) and has a characteristic CL2 in a second stage angular range L2 of the low torsion angular range L. Additionally, the clutch disc assembly 1 has a characteristic CH3 in a third stage angular range H3 of a high torsion angular range H, has a characteristic CH4 in a fourth stage angular range H4 of the high torsion angular range H, and has a characteristic CH5 in a fifth stage angular range H5 of the high torsion angular range H. It should be noted that specific numeric values of the torsion angle shown in FIG. 3 and those of the torsion angle to be described are exemplary only.

[Input-Side Plate 2]

The input-side plate 2 is a member to which a torque form the flywheel (not shown in the drawings) is inputted, and includes a clutch plate (second input plate) 11, a retaining plate (first input plate) 12 and a clutch disc 13.

<Clutch Plate 11 and Retaining Plate 12>

The clutch plate 11 and the retaining plate 12 are annular disc members, and are axially disposed at a predetermined interval. The clutch plate 11 is disposed on the engine side, whereas the retaining plate 12 is disposed on the transmission side. The clutch plate 11 and the retaining plate 12 are fixed to each other by a part of the retaining plate 12 composing a part of a stopper mechanism 15 to be described, and are immovable relatively to each other in both axial and rotational directions.

Each of the clutch plate 11 and the retaining plate 12 includes four window holes 11a, 12a in the outer peripheral part thereof, and the window holes 11a, 12 are aligned at equal intervals in a rotational direction. Cut-and-raised parts are formed on the inner and outer peripheral sides of each window hole 11a, 12a.

Additionally, the inner peripheral end of the clutch plate 11 is bent to be opened toward the engine, and is constructed as a press-contact part 11b. The retaining plate 12 includes a plurality of internal teeth 12b on the inner peripheral end thereof.

<Clutch Disc 13>

The clutch disc 13 is a portion configured to be pressed onto the flywheel (not shown in the drawings). The clutch disc 13 is constructed similarly to a heretofore known clutch disc, and is composed of a cushioning plate 13a and friction facings 13b fixed to the both surfaces of the cushioning plate 13a. Detailed explanation of the clutch disc 13 will not be provided.

[Output Unit 3]

The output unit 3 is disposed axially between the clutch plate 11 and the retaining plate 12, and is rotatable relatively to the clutch plate 11 and the retaining plate 12. The output unit 3 includes a hub (output-side member) 17 and a flange (input-side member) 18. The hub 17 is disposed in the inner peripheral part of the clutch plate 11 and that of the retaining plate 12, and the flange 18 extends radially outward from the hub 17. The hub 17 and the flange 18 are separated, and are rotatable relatively to each other within a predetermined angular range (of 17 degrees in this example).

<Hub 17>

The hub 17 is a circular member and includes a large diameter part 21, a first small diameter part 22 and a second small diameter part 23 on the outer peripheral surface thereof. The large diameter part 21 is formed in the axial middle part of the hub 17, whereas the first small diameter part 22 and the second small diameter part 23 are formed on the axial both ends of the hub 17. The first small diameter part 22 is formed on the retaining plate 12 side of the large diameter part 21, whereas the second small diameter part 23 is formed on the clutch plate 11 side of the large diameter part 21. The large diameter part 21 includes a plurality of external teeth 21a on the outer peripheral surface thereof. The external teeth 21a of the large diameter part 21 is formed over the entire axial length of the large diameter part 21. However, as shown in schematic diagrams of FIGS. 10 to 13, in each external tooth 21a, the tooth width of the axial middle part and that of the first small diameter part 22-side part are equal, but the tooth width of the second small diameter part 23-side part is smaller than the tooth widths of the other parts (by a torsion angle of 7 degrees in this example). Additionally, the hub 17 includes a spline hole 17a on the inner peripheral surface thereof. The spline hole 17a is engageable with an input shaft of the transmission (not shown in the drawings).

<Flange 18>

As shown in an exploded view, the flange 18 is a roughly disc-shaped member, and a hole 24, through which the hub 17 is inserted, is bored in the center part of the flange 18. The hole 24 includes a plurality of internal teeth 24a. The external teeth 21a, formed on the large diameter part 21 of the hub 17, are meshable with the plural internal teeth 24a. Each internal tooth 24a is constructed to have a longer circumferential length than each external tooth 21a. In other words, gaps are produced between the both end surfaces of each internal tooth 24a and each external tooth 21a, and the gaps correspond to an angular range (of 17 degrees) in which the flange 18 and the hub 17 are rotatable relatively to each other.

The flange 18 includes four spring accommodation parts 25 in the outer peripheral part thereof, and the spring accommodation parts 25 are circumferentially aligned at equal intervals. The respective spring accommodation parts 25 include openings 25a for accommodating the high stiffness damper unit 4. The openings 25a are disposed in corresponding positions to the four window holes 11a of the clutch plate 11 and the four window holes 12a of the retaining plate 12. Each opening 25a includes an engaging recess 25b, recessed to the inner peripheral side, on the circumferential middle of the inner peripheral edge thereof. Additionally, each spring accommodation part 25 includes a stopper protrusion 25c on the circumferential middle of the outer peripheral surface thereof.

[Stopper Mechanism 15]

The stopper mechanism 15 is a mechanism for restricting relative rotation between the flange 18 and both the clutch plate 11 and the retaining plate 12. The stopper mechanism 15 is composed of stopper parts 12c (see FIG. 5) formed in the retaining plate 12 and the stopper protrusions 25c formed in the flange 18.

Figure 5:
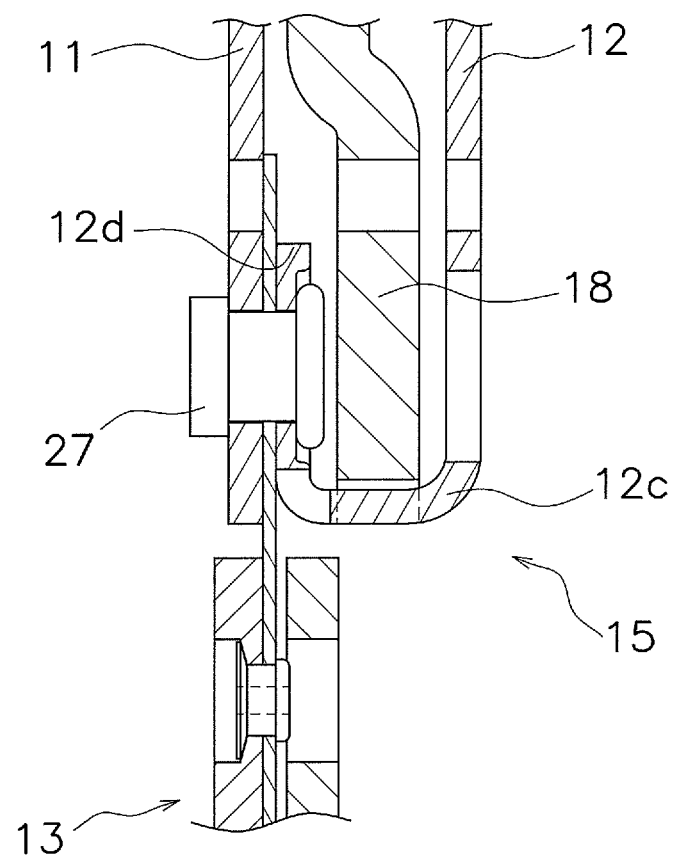
FIG. 5 is a partial cross-sectional view of a stopper mechanism.

Specifically, as shown in FIGS. 1 and 5, the retaining plate 12 includes four bent parts in the outer peripheral part thereof, and the bent parts are aligned at equal intervals in the rotational direction. The bent parts are formed by bending parts, which are extended to the outer peripheral side from the outer peripheral part of the retaining plate 12, toward the clutch plate 11 and by further bending the parts to the inner peripheral side. In other words, each bent part includes the stopper part 12c and a fixed part 12d. The stopper part 12c is formed by bending the part extended from the outer peripheral part of the retaining plate 12 toward the clutch plate 11. The fixation part 12d is formed by further bending the tip of the stopper part 12c to the inner peripheral side. Additionally, the fixation parts 12d are fixed together with the clutch disc 13 to the clutch plate 11 by rivets 27. It should be noted that the fixation parts 12d and the rivets 27 are disposed axially between the flange 18 and the clutch plate 11. Accordingly, the flange 18 and both the clutch plate 11 and the retaining plate 12 are prevented from interfering with each other when both the clutch plate 11 and the retaining plate 12 are rotated relatively to the flange 18.

The stopper parts 12c are rotatable along the outer peripheral surfaces of the spring accommodation parts 25 of the flange 18. Additionally, this rotation is restricted when the stopper parts 12c are contacted to the circumferential end surfaces of the stopper protrusions 25c of the flange 18.

With the aforementioned construction, relative rotation of both the clutch plate 11 and the retaining plate 12 to the flange 18 is enabled between each adjacent two of the stopper protrusions 25c. In other words, relative rotation of both the clutch plate 11 and the retaining plate 12 to the flange 18 is restricted to an angular range between each adjacent two of the stopper protrusions 25c.

[High Stiffness Damper Unit 4]

The high stiffness damper unit 4 is configured to elastically couple the flange 18 and both the clutch plate 11 and the retaining plate 12 in the rotational direction, and is configured to be actuated in the high torsion angular range H (see FIG. 3) of the torsional characteristics. As shown in FIG. 2, the high stiffness damper unit 4 is composed of four sets of spring units 4a, and each set is accommodated in each opening 25a of the flange 18. Additionally, each spring unit 4a is restricted from moving in both radial and axial directions by each window hole 11a of the clutch plate 11 and each window hole 12a of the retaining plate 12.

Each spring unit 4a includes a first spring 31 for high stiffness, a second spring 32 for high stiffness, a resin elastic member 33, and a pair of spring sheets 34. The first spring 31 for high stiffness is constructed as a coil spring having a relatively high stiffness, and has a coil length that is roughly the same as the circumferential length of the opening 25a in each spring accommodation part 25. Additionally, the both ends of the first spring 31 are contacted at their parts disposed on the inner peripheral side to the circumferential end surfaces of the opening 25a in the flange 18, the end surfaces of the window hole 11a of the clutch plate 11, and the end surfaces of the window hole 12a of the retaining plate 12. However, the both ends of the first spring 31 are separated at their parts disposed on the outer peripheral side by a gap from the circumferential end surfaces of the opening 25a of the flange 18, the end surfaces of the window hole 11a of the clutch plate 11, and the end surfaces of the window hole 12a of the retaining plate 12. Additionally, the both ends of the first spring 31 are contactable to the both circumferential end surfaces of the opening 25a. The resin elastic member 33 is disposed on the further inner peripheral side of the second spring 32 for high stiffness, and has a length shorter than the coil length of the second spring 32 for high stiffness. One ends of the spring sheets 34 of the pair are fitted into recesses 25d (see FIG. 4) formed on the both circumferential end surfaces of the opening 25a, and the other ends thereof extend into the interior of the second spring 32 for high stiffness. Additionally, the spring sheets 34 of the pair support the both ends of the second spring 32 for high stiffness.

With the high stiffness damper unit 4 as described above, the torsional characteristics are configured to exert a relatively high stiffness after the first spring 31 is contacted at the aforementioned parts disposed on the inner peripheral side to the end surfaces of the opening 25 until the first spring 31 the first spring 31 is contacted at the aforementioned parts disposed on the outer peripheral side to the end surfaces of the opening 25a of the flange 18, and then, are configured to exert a higher stiffness after the end surfaces of the first spring 31 are entirely contacted to the end surfaces of the opening 25a.

[First Low Stiffness Damper Unit 5]

Figure 6:
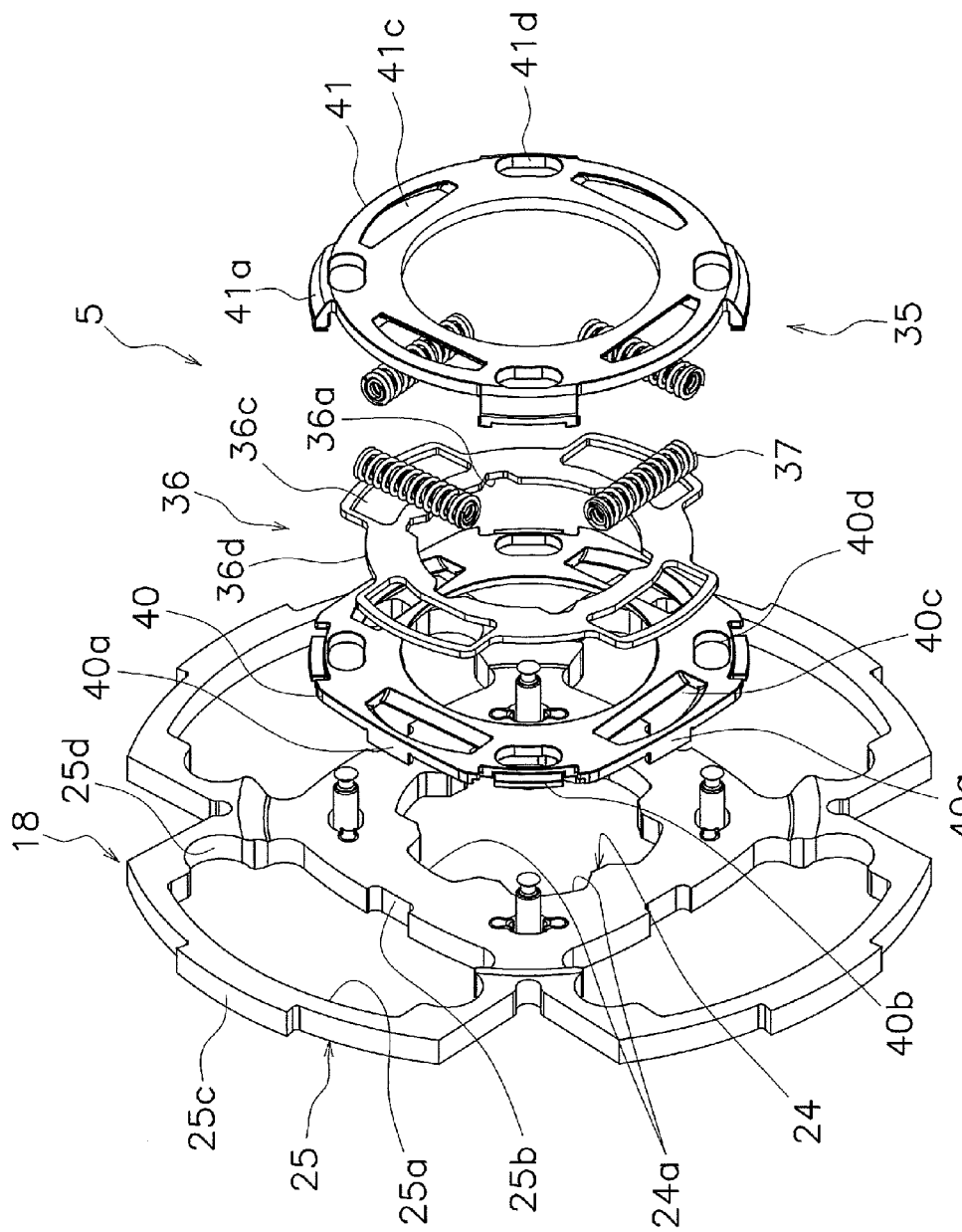
FIG. 6 is an external exploded perspective view of the flange and a first low stiffness damper unit.
Figure 8:
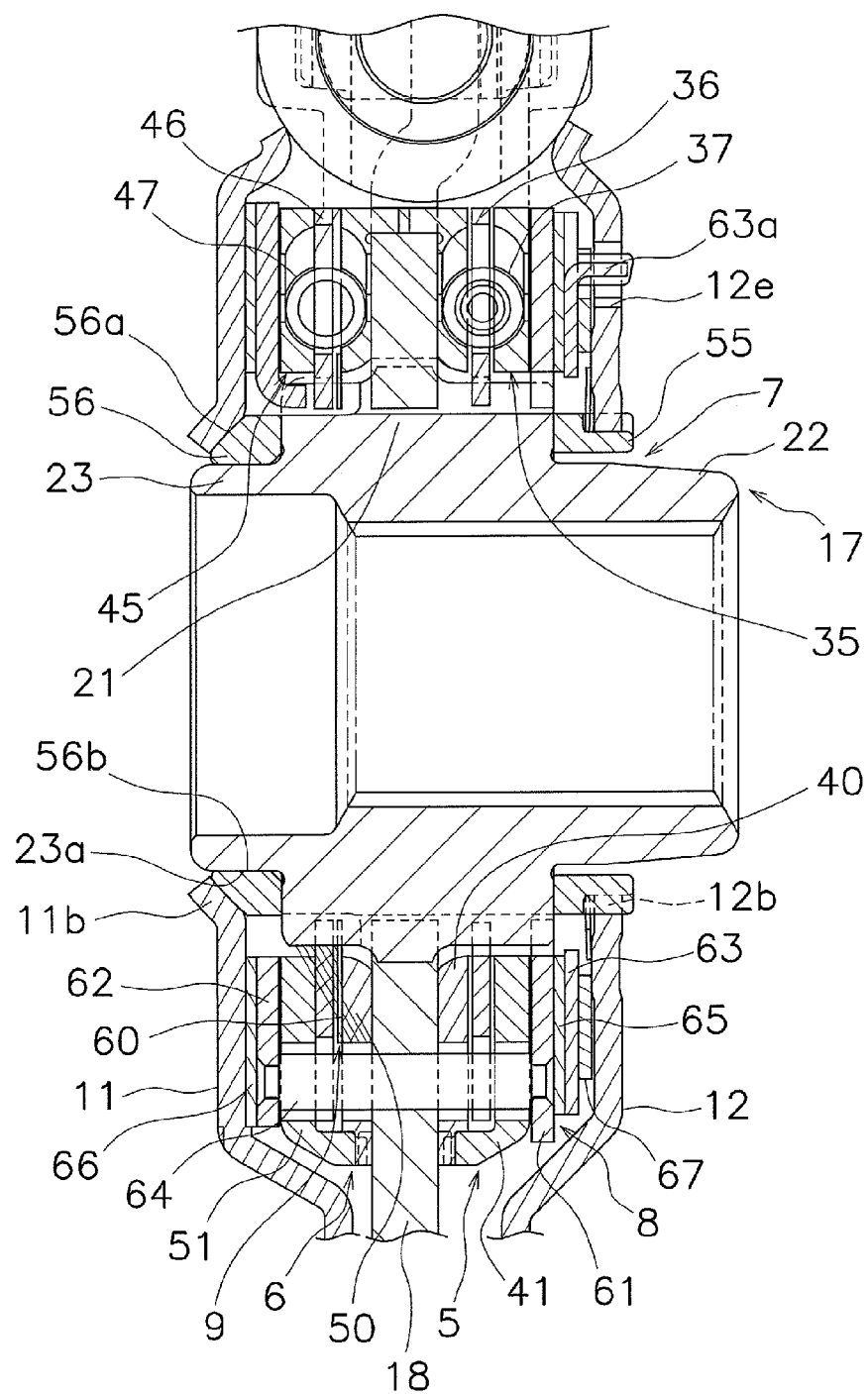
FIG. 8 is a partial enlarged view of FIG. 1.

The first low stiffness damper unit 5 is configured to elastically couple the flange 18 and the hub 17 in the rotational direction. As shown in FIG. 3, the first low stiffness damper unit 5 is configured to be actuated in the first stage angular range L1 and the second stage angular range L2 of the low torsion angular range L of the torsional characteristics. In other words, the first low stiffness damper unit 5 has a lower stiffness than the high stiffness damper unit 4. The first low stiffness damper unit 5 is disposed between the flange 18 and the inner peripheral part of the retaining plate 12. As shown in FIGS. 6 and 8, the first low stiffness damper unit 5 includes a pair of first holder plates 35, a first drive plate 36, and first springs 37 for low stiffness.

<First Holder Plates 35>

The first holder plates 35 of the pair are annular members, and each has a hole in the inner peripheral part thereof so as to insert the hub 17 therethrough. The pair of first holder plates 35 is composed of a first engaging plate 40 and a first cover plate 41. The first engaging plate 40 is disposed on the flange 18 side, whereas the first cover plate 41 is disposed axially in opposition to the first engaging plate 40.

The first engaging plate 40 includes engaging pawls 40a in four positions on the outer peripheral surface thereof. The engaging pawls 40a protrude toward the flange 18, and are engaged with the engaging recesses 25b of the flange 18 without any gap. Therefore, the first engaging plate 40 is non-rotatable relatively to the flange 18. Additionally, the first engaging plate 40 includes protrusions 40b for fixation, each of which is disposed between adjacent two of the engaging pawls 40a. The fixation protrusions 40b protrude to the outer peripheral side. Moreover, the first engaging plate 40 includes four openings 40c for accommodating springs and four circular-arc elongated holes 40d disposed among the openings 40c in the rotational direction.

The first cover plate 41 includes lock pawls 41a in four positions on the outer peripheral surface thereof. The lock pawls 41a are disposed in corresponding positions to the fixation protrusions 40b of the first engaging plate 40, and extend toward the first engaging plate 40. When the lock pawls 41a are engaged with the fixation protrusions 40b of the first engaging plate 40, the first cover plate 41 can be fixed to the first engaging plate 40 while an axial gap is produced therebetween. Additionally, the first cover plate 41 includes openings 41c and elongated holes 41d. The openings 41c have the same shape as the openings 40c of the first engaging plate 40, and are disposed in corresponding positions to the openings 40c. The elongated holes 41d have the same shape as the elongated holes 40d of the first engaging plate 40, and are disposed in corresponding positions to the elongated holes 40d.

<First Drive Plate 36>

The first drive plate 36 is an annular member that the hub 17 is inserted through the inner peripheral part thereof. The first drive plate 36 includes a plurality of internal teeth 36a on the inner peripheral edge thereof. The first small diameter part 22-side parts of the external teeth 21a of the large diameter part 21 of the hub 17 are engaged with the internal teeth 36a without any gap. Therefore, the first drive plate 36 is non-rotatable relatively to the hub 17, and is rotated in synchronization therewith.

The first drive plate 36 includes four openings 36c for accommodating springs. Additionally, the first drive plate 36 includes cutouts 36d in parts other than the parts in which the openings 36c are bored. The cutouts 36d are disposed in corresponding positions to the elongated holes 40d and 41d of the respective plates 40 and 41.

<First Springs 37 for Low Stiffness>

The first springs 37 for low stiffness elastically couple the pair of first holder plates 35 and the first drive plate 36 in the rotational direction. The first springs 37 are accommodated in the openings 36c of the first drive plate 36 and are supported by the openings 40c and 41c of the pair of first holder plates 35 such that the first springs 37 are restricted from moving in both axial and radial directions.

[Second Low Stiffness Damper Unit 6]

Figure 7:
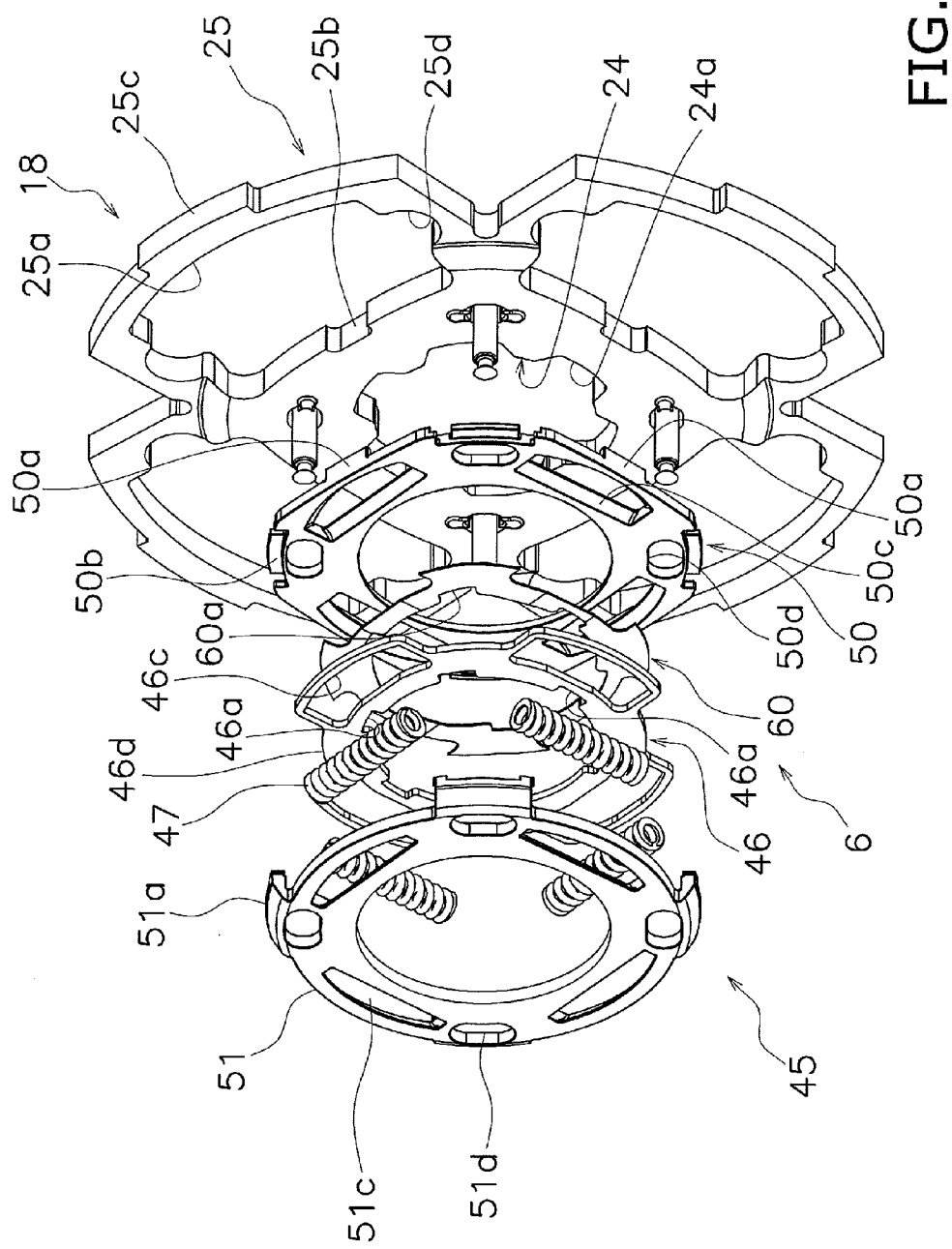
FIG. 7 is an external exploded perspective view of the flange and a second low stiffness damper unit.

The second low stiffness damper unit 6 is configured to elastically couple the flange 18 and the hub 17 in the rotational direction. As shown in FIG. 3, the second low stiffness damper unit 6 is configured to be actuated in the second stage L2 of the low torsion angular range L of the torsional characteristics. In other words, the second low stiffness damper unit 6 is configured to be actuated later than actuation of the first low stiffness damper unit 5, and has a lower stiffness than the high stiffness damper unit 4. The second low stiffness damper unit 6 is disposed between the flange 18 and the inner peripheral part of the clutch plate 11. As shown in FIGS. 7 and 8, the second low stiffness damper unit 6 includes a pair of second holder plates 45, a second drive plate 46, and second springs 47 for low stiffness.

<Second Holder Plates 45>

The second holder plates 45 of the pair are annular members, and each has a hole in the inner peripheral part thereof so as to insert the hub 17 therethrough. The pair of second holder plates 45 is composed of a second engaging plate 50 and a second cover plate 51. The second engaging plate 50 is disposed on the flange 18 side, whereas the second cover plate 51 is disposed axially in opposition to the second engaging plate 50.

The second engaging plate 50 includes engaging pawls 50a in four positions on the outer peripheral surface thereof. The engaging pawls 50a protrude toward the flange 18, and are engaged with the engaging recesses 25b of the flange 18 without any gap. Therefore, the second engaging plate 50 is non-rotatable relatively to the flange 18. Additionally, the second engaging plate 50 includes protrusions 50b for fixation, each of which is disposed between adjacent two of the engaging pawls 50a. The fixation protrusions 50b protrude to the outer peripheral side. Moreover, the second engaging plate 50 includes four openings 50c for accommodating springs and four circular-arc elongated holes 50d disposed among the openings 50c in the rotational direction.

The second cover plate 51 includes lock pawls 51a in four positions on the outer peripheral surface thereof. The lock pawls 51a are disposed in corresponding positions to the fixation protrusions 50b of the second engaging plate 50, and extend toward the second engaging plate 50. When the lock pawls 51a are engaged with the fixation protrusions 50b of the second engaging plate 50, the second cover plate 51 can be fixed to the second engaging plate 50 while an axial gap is produced therebetween. Additionally, the second cover plate 51 includes openings 51c and elongated holes 51d. The openings 51c have the same shape as the openings 50c of the second engaging plate 50, and are disposed in corresponding positions to the openings 50c. The elongated holes 51d have the same shape as the elongated holes 50d of the second engaging plate 50, and are disposed in corresponding positions to the elongated holes 50d.

<Second Drive Plate 46>

The second drive plate 46 is an annular member that the hub 17 is inserted through the inner peripheral part thereof. The second drive plate 46 includes a plurality of internal teeth 46a on the inner peripheral edge thereof. The second small diameter part 23-side parts (parts having a small tooth width) of the external teeth 21a of the large diameter part 21 of the hub 17 are respectively inserted into the internal teeth 46a through predetermined gaps therebetween. The predetermined gaps are produced by the construction that the part of each external tooth 21a, meshed with each internal tooth 46a of the second drive plate 46, has a smaller tooth width than the other part thereof. Therefore, the second drive plate 46 is rotatable relatively to the hub 17 by an angle (of 7 degrees in this example) corresponding to the gaps.

The second drive plate 46 includes four openings 46c for accommodating springs. Additionally, the second drive plate 46 includes cutouts 46d in parts other than the parts in which the openings 46c are bored. The cutouts 46d are disposed in corresponding positions to the elongated holes 50d and 51d of the respective plates 50 and 51.

<Second Springs 47 for Low Stiffness>

The second springs 47 for low stiffness elastically couple the pair of second holder plates 45 and the second drive plate 46 in the rotational direction. The second springs 47 are accommodated in the openings 46c of the second drive plate 46 and are supported by the openings 50c and 51c of the pair of second holder plates 45 such that the second springs 47 are restricted from moving in both axial and radial directions.

[First Hysteresis Torque Generating Mechanism 7]

The first hysteresis torque generating mechanism 7 is configured to generate a first hysteresis torque HT1 in the angular range L1 of the first low stiffness damper unit 5. Specifically, the first hysteresis torque generating mechanism 7 is configured to generate the first hysteresis torque HT1, which is the lowest torque, in the first stage angular range L1 (of 0-7 degrees in this example) of the low torsion angular range L.

Figure 4:
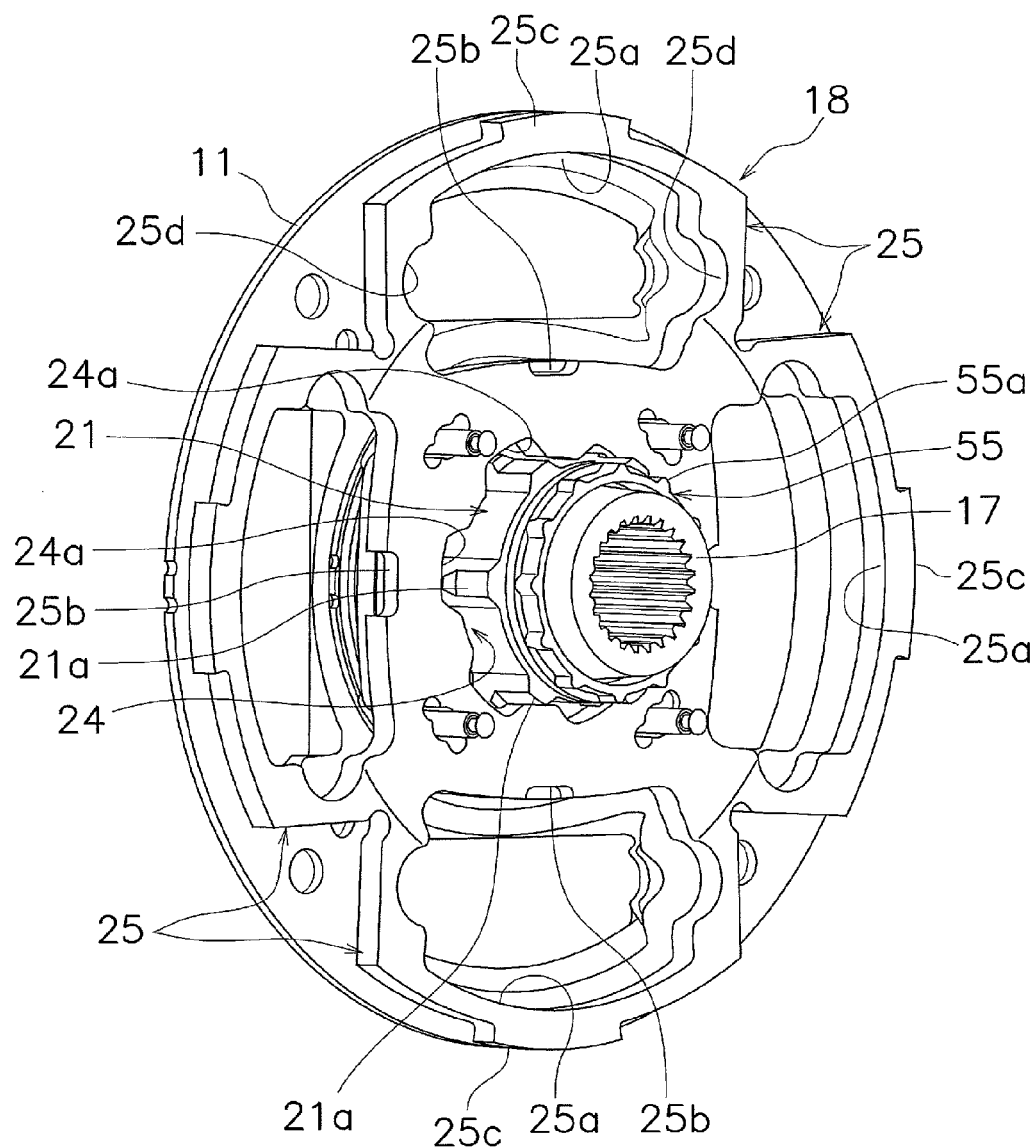
FIG. 4 is an external perspective view of a hub and a flange.

As shown in FIG. 8, the first hysteresis torque generating mechanism 7 includes a first bushing 55 and a second bushing 56. The first bushing 55 is disposed on the outer peripheral side of the first small diameter part 22 of the hub 17. The second bushing 56 is disposed on the outer peripheral side of the second small diameter part 23. The first bushing 55 is a cylindrical member made of resin, and is rotatable relatively to the hub 17. As shown in FIGS. 2 and 4, the first bushing 55 includes a plurality of external teeth 55a on the outer peripheral surface thereof. Additionally, the plural internal teeth 12b formed on the inner peripheral surface of the retaining plate 12 are engaged with the external teeth 55a. Thus, the retaining plate 12 and the first bushing 55 are non-rotatable relatively to each other. With the construction, when the retaining plate 12 and the hub 17 are rotated relatively to each other, the engine-side lateral surface of the first bushing 55 slides in contact with the lateral surface of the large diameter part 21 of the hub 17. Accordingly, a hysteresis torque, which is a friction torque, is generated.

The second bushing 56 is an annular member made of resin. As shown in FIG. 8, the second bushing 56 includes a spherical friction surface 56a on the engine-side lateral surface thereof, and the friction surface 56a is contacted to the press-contact part 11b of the clutch plate 11. Additionally, the second small diameter part 23 includes two pairs of planar parts 23a on the outer peripheral surface thereof, and the planar parts 23a of each pair are opposed to each other. Likewise, the second bushing 56 includes two pairs of planar parts 56b on the inner peripheral surface thereof, and the pairs of planar parts 23a and the pairs of planar parts 56b are engaged with each other. Therefore, the second bushing 56 is non-rotatable relatively to the hub 17. With the construction, when the clutch plate 11 and the hub 17 are rotated relatively to each other, the spherical friction surface 56a of the second bushing 56 and the press-contact part 11b of the clutch plate 11 slide in contact with each other. Accordingly, a hysteresis torque, which is a friction torque, is generated.

As described above, a first hysteresis torque is generated by the hysteresis torque generated between the first bushing 55 and the lateral surface of the large diameter part 21 of the hub 17 and that generated between the friction surface 56a of the second bushing 56 and the press-contact part 11b of the clutch plate 11.

[Intermediate Hysteresis Torque Generating Mechanism 9 and Second Hysteresis Torque Generating Mechanism 8]

The intermediate hysteresis torque generating mechanism 9 is configured to generate an intermediate hysteresis torque HTm, which is higher than the first hysteresis torque HT1, in the lower torsion angular side part of the actuation range L2 of the second low stiffness damper unit 6. Specifically, the intermediate hysteresis torque generating mechanism 9 is configured to generate the intermediate hysteresis torque HTm, which is higher than the first hysteresis torque HT1, in a part of the second stage L2 except for the higher torsion angular part thereof (in a range of 7 to 15.5 degrees in this example).

On the other hand, the second hysteresis torque generating mechanism 8 is configured to generate a second hysteresis torque HT2 in the higher torsion angular part of the actuation range L2 of the second low stiffness damper unit 6 and an angular range H of the high stiffness damper unit 4. Specifically, the second hysteresis torque generating mechanism 8 is configured to generate the second hysteresis torque HT2, which is higher than the intermediate hysteresis torque HTm, in the higher torsion angular part of the second stage L2 of the low torsion angular range L (in a range of 15.5 to 17 degrees) and the entire high torsion angular range H.

Figure 9:
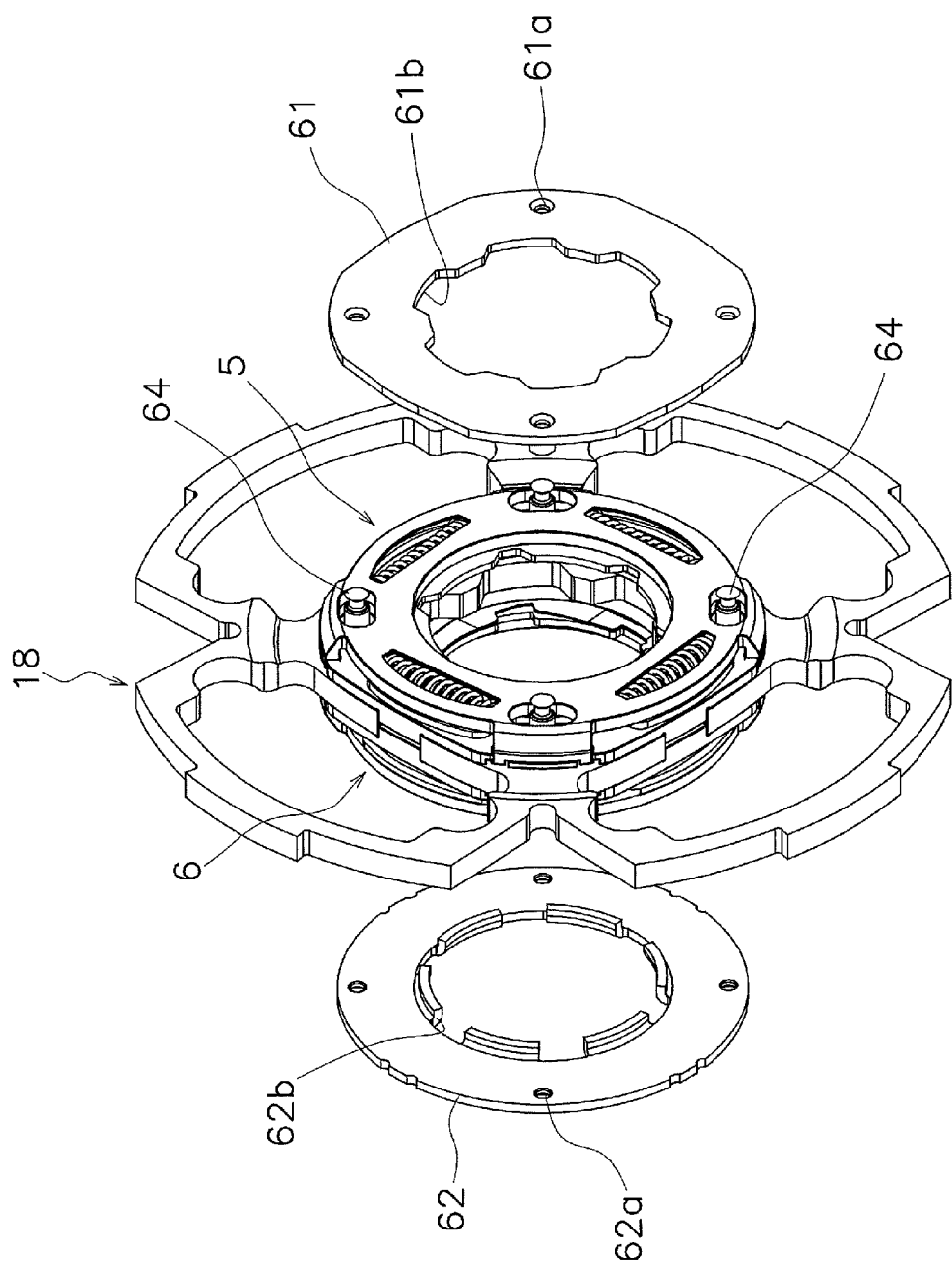
FIG. 9 is an external exploded perspective view of part of a second hysteresis torque generating mechanism.

As shown in FIGS. 8 and 9, the intermediate hysteresis torque generating mechanism 9 and the second hysteresis torque generating mechanism 8 include a wave spring 60, first to third friction plates 61, 62 and 63, four stud pins 64, first and second friction washers 65 and 66, and a cone spring 67 in addition to the first hysteresis torque generating mechanism 7.

The wave spring 60 (also shown in FIG. 7) is an elastic member that has an annular shape and includes convex and concave parts in the axial direction. The wave spring 60 is disposed between the second drive plate 46 and the second engaging plate 50 in the second low stiffness damper unit 6. The wave spring 60 includes internal teeth 60a on the inner peripheral edge thereof. The internal teeth 60a are respectively disposed onto the second small diameter part 23-side parts (parts having a small tooth width) of the external teeth 21a formed on the large diameter part 21 of the hub 17 through predetermined gaps therebetween. In other words, the groove width (circumferential length) of each internal tooth 60a and that of each internal tooth 46a of the second drive plate 46 are equal. Therefore, the wave spring 60 is rotatable relatively to the hub 17 only by a predetermined angular range (of 7 degrees in this example). With the wave spring 60, the second drive plate 46 and the second cover plate 51 slide in contact with each other, and the wave spring 60 and the second engaging plate 50 slide in contact with each other. Accordingly, hysteresis torques, which are friction torques, can be generated in these positions (as the intermediate hysteresis torque).

As shown in FIG. 9, each of the first and second friction plates 61 and 62 has an annular shape, and includes four holes 61a, 62a circumferentially aligned at equal intervals. The first friction plate 61 is disposed between the first low stiffness damper unit 5 and the retaining plate 12. On the other hand, the second friction plate 62 is disposed between the second low stiffness damper unit 6 and the clutch plate 11.

As shown in FIG. 9, the first friction plate 61 includes a plurality of internal teeth 61b on the inner peripheral surface thereof. The external teeth 21a of the hub 17 are inserted into the internal teeth 61b, and gaps corresponding to a predetermined angle (of 15.5 degrees in this example) are produced between each internal tooth 61b and each external tooth 21a. It should be noted that each internal tooth 61b is constructed to have a tooth width (circumferential length) smaller than that of each internal tooth 24a of the flange 18. Therefore, when positive-side torsion occurs in the present clutch disc assembly, the external teeth 21a of the hub 17 are firstly contacted to the end surfaces of the internal teeth 61b of the first friction plate 61 (torsion angle=15.5 degrees). When further positive-side torsion then occurs in the present clutch disc assembly (torsion angle=17 degrees), the external teeth 21a of the hub 17 are configured to be contacted to the end surfaces of the internal teeth 24a of the flange 18.

Additionally, as shown in FIG. 9, the inner peripheral surface of the second friction plate 62 is bent axially toward the flange 18, and this bent part includes a plurality of cutouts 62b. The external teeth 21a of the hub 17 are inserted into the plural cutouts 62b, and each cutout 62b is constructed to have a width (circumferential length) smaller than the tooth width of each internal tooth 24a of the flange 18. Therefore, similarly to the case of the first friction plate 61, when positive-side torsion occurs in the present clutch disc assembly, the external teeth 21a of the hub 17 are firstly contacted to the end surfaces of the cutouts 62b of the second friction plate 62 (torsion angle=15.5 degrees). When further positive-side torsion then occurs in the present clutch disc assembly (torsion angle=17 degrees), the external teeth 21a of the hub 17 are configured to be contacted to the end surfaces of the internal teeth 24a of the flange 18.

The first friction plate 61 and the second friction plate 62 are fixed to each other by the four stud pins 64 such that the both plates are immovable in both axial and rotational directions. It should be noted that the stud pins 64 penetrate the circular-arc elongated holes and cutouts 40d, 36d, 41d, 50d, 46d and 51d bored and cut in the respective plates in the first and second low stiffness damper units 5 and 6. Therefore, the first and second friction plates 61 and 62 and the first and second low stiffness damper units 5 and 6 are rotatable relatively to each other in a predetermined angular range.

Additionally, the first friction washer 65, made of resin for instance, is disposed on the retaining plate 12 side of the first friction plate 61, whereas the third friction plate 63 and the cone spring 67 are disposed between the first friction washer 65 and the retaining plate 12. The cone spring 67 is assembled in a compressed state. Additionally, the second friction washer 66, made of resin for instance, is disposed between the second friction plate 62 and the clutch plate 11. It should be noted that the material, of which the first and second friction washers 65 and 66 are made, is not limited to resin.

It should be noted that the third friction plate 63 includes a plurality of pawls 63a on the outer peripheral part thereof, and the pawls 63a are bent toward the retaining plate 12. The pawls 63a are engaged with holes 12e bored in the retaining plate 12. Accordingly, the third friction plate 63 and the retaining plate 12 are prevented from rotating relatively to each other.

With the aforementioned construction, even when relative rotation occurs between the input-side clutch plate 11 and retaining plate 12 and the output-side flange 18, relative rotation does not occur between the both input-side plates 11 and 12 and the both friction plates 61 and 62 in an angular range (of 0-15.5 degrees) that the internal teeth 21 of the hub 17 and both the internal teeth 61b of the first friction plate 61 and the cutouts 62b of the second friction plate 62 are contacted to each other.

However, when relative rotation (torsion) of 15.5 degrees or greater occurs between the both input-side plates 11 and 12 and the flange 18, the external teeth 21a of the hub 17 are contacted to the end surfaces of both the internal teeth 61b and the cutouts 62b of the both friction plates 61 and 62, and relative rotation occurs between the flange 18 and both the clutch plate 11 and the retaining plate 12. In this case, the first and second friction washers 65 and 66 respectively slide in contact with their adjacent members, and hysteresis torques, which are friction torques, are generated therein. The second hysteresis torque HT2 is generated by the hysteresis torques and the aforementioned first hysteresis torque HT1 (generated in the entire torsion angular range).

It should be noted that the first and second low stiffness damper units 5 and 6 and the first and second friction plates 61 and 62 are combined as a unit by the stud pins 64, and the axial length of this unit is determined by the length of the stud pins 64. Additionally, in this exemplary embodiment, the axial length determined by the stud pins 64 is longer than the total axial length (thickness) of the respective members and the flange that compose this unit. Therefore, in this unit, loads do not act on the respective friction plates 61 and 62 in a range that this unit is unitarily actuated (high torsion angular range), and in principle, a hysteresis torque is not generated.

[Actions]

Actions in occurrence of positive-side torsion will be herein explained with the torsional characteristic diagram and schematic diagrams of FIGS. 10 to 13, whereas negative-side torsional characteristics will not be explained.

<Low Torsion Angular Range: First Stage Angle L1>

When the input-side clutch plate 11 and retaining plate 12 are rotated relatively to the output-side hub 17 to the R1 side, the first and second low stiffness damper units 5 and 6 are firstly actuated because the input-side high stiffness damper unit 4 has a high stiffness. In other words, the clutch plate 11, the retaining plate 12, the spring units 4a and the flange 18 are unitarily rotated, and rotation of these members is transmitted to the first and second low stiffness damper units 5 and 6 engaged with the flange 18. Specifically, a torque is transmitted from the flange 18 to the both low stiffness damper units 5 and 6 by engagement between the engaging recesses 25b of the flange 18 and the engaging pawls 40a and 50a of the first and second engaging plates 40 and 50 of the both low stiffness damper units 5 and 6.

Figure 10:
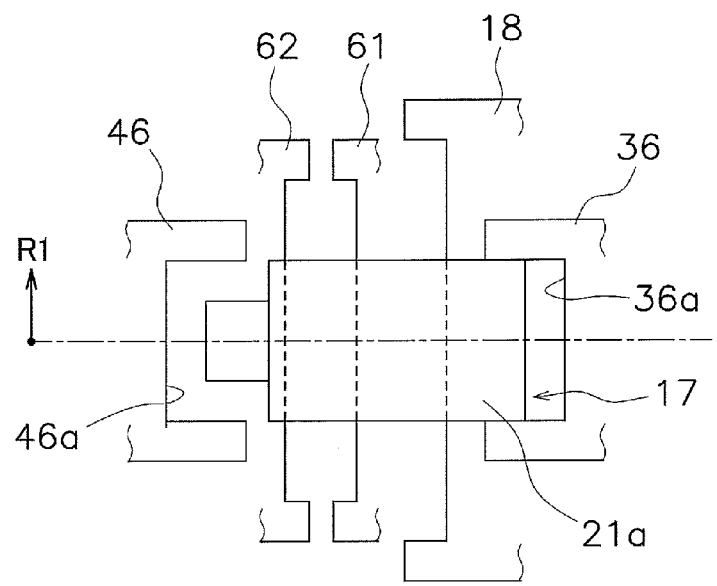
FIG. 10 is a schematic diagram for explaining a series of motions.

Now as schematically shown in FIG. 10, the first drive plate 36 (the internal teeth 36a) of the first low stiffness damper unit 5 and the large diameter part 21 (the external teeth 21a) of the hub 17 are engaged without any gap. However, the external teeth 21a of the large diameter part 21, with which the second drive plate 46 (the internal teeth 46a) of the second low stiffness damper unit 6 is engaged, has a small tooth width. Hence, the second drive plate 46 of the second low stiffness damper unit 6 is allowed to be rotated relatively to the hub 17 by a predetermined angle (of 7 degrees). Therefore, in a torsion angular range of 0 to 7 degrees, the first springs 37 for low stiffness of the first low stiffness damper unit 5 are only actuated, and as shown in FIG. 3, the first stage torsional characteristic CL1 having the lowest stiffness is exerted.

At this time, a hysteresis torque is generated between the first bushing 55 configured to be rotated in synchronization with the retaining plate 12 and the lateral surface of the large diameter part 21 of the hub 17. On the other hand, a hysteresis torque is generated between the friction surface 56a of the second bushing 56 configured to be rotated in synchronization with the hub 17 and the press-contact part 11b of the clutch plate 11. These torques compose the first hysteresis torque HT1 that is relatively low as described above.

As described above, in the first stage angle L1, obtained are characteristics of the first hysteresis torque HT1 that has a low stiffness due to the first springs 37 for low stiffness and is relatively low due to the first bushing 55 and the second bushing 56.

<Low Torsion Angular Range: Second Stage Angular Range L2>

Figure 11:
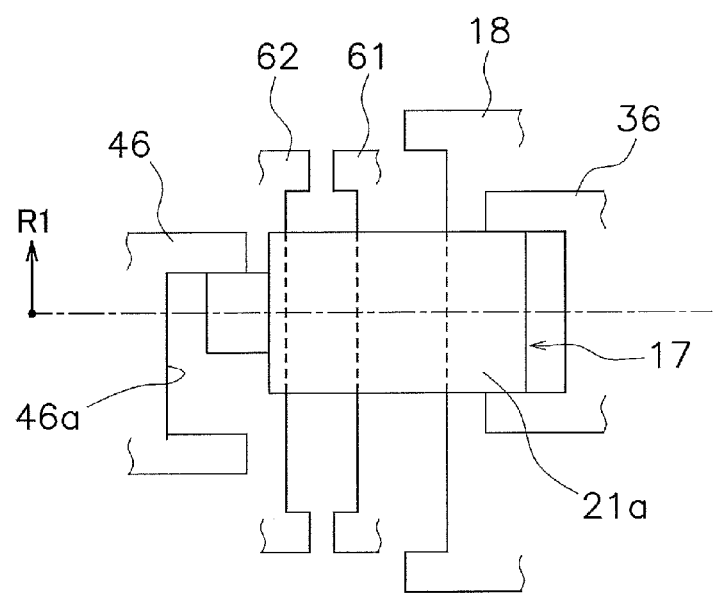
FIG. 11 is a schematic diagram for explaining the series of motions.

When the torsion angle increases and reaches 7 degrees, as shown in FIG. 11, the second drive plate 46 (the internal teeth 46a) of the second low stiffness damper unit 6 and the large diameter part 21 (the external teeth 21a) of the hub 17 are engaged. Accordingly, in addition to the first springs 37 for low stiffness of the first low stiffness damper unit 5, the second springs 47 for low stiffness of the second low stiffness damper unit 6 are also actuated. Therefore, the torsional characteristic in this range has a stiffness higher than that of the first stage characteristic CL1. This actuation continues until the flange 18 and the hub 17 are contacted to each other (until the torsion angle reaches 17 degrees).

Additionally in this second stage angular range L2, the wave spring 60 (the internal teeth 60a) and the large diameter part 21 (the external teeth 21a) of the hub 17 are engaged. At this time, the second drive plate 46 and the second cover plate 51 slide in contact with each other, and likewise, the wave spring 60 and the second engaging plate 50 slide in contact with each other. Thus, hysteresis torques (intermediate hysteresis torque HTm) are generated in these positions. This intermediate hysteresis torque HTm is a hysteresis torque higher than the first hysteresis torque HT1.

Figure 12:
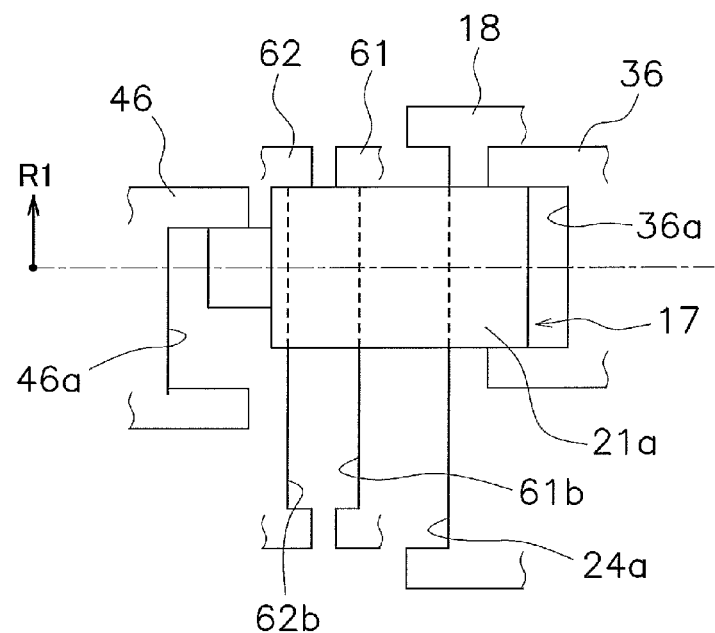
FIG. 12 is a schematic diagram for explaining the series of motions.

On the other hand, when the torsion angle further increases (to 15.5 degrees), and as shown in FIG. 12, the external teeth 21a of the hub 17 are contacted to the end surfaces of the internal teeth 61b of the first friction plate 61 and those of the cutouts 62b of the second friction plate 62, relative rotation occurs between the first friction plate 61 and the retaining plate 12 and between the second friction plate 62 and the clutch plate 11. Therefore, a hysteresis torque is generated between the first friction washer 65 and either the first friction plate 61 or the third friction plate 63, and likewise, a hysteresis torque is generated between the second friction washer 66 and either the second friction plate 62 or the clutch plate 11. The second hysteresis torque HT2, which is higher than the first hysteresis torque HT1 and the intermediate hysteresis torque HTm, is generated by these hysteresis torques and the aforementioned first hysteresis torque HT1.

As described above, the characteristic CL2 is exerted in the second stage angular range L2. The characteristic CL2 has a higher stiffness than the first characteristic CL1 attributed to the first and second springs 37 and 47 for low stiffness. Additionally, the intermediate hysteresis torque HTm, which is higher than the first hysteresis torque HT1, is generated in the lower torsion angular part of the second stage angular range L2, whereas the second hysteresis torque HT2, which is higher than the first hysteresis torque HT1, is generated in the higher torsion angular part of the second stage angular range L2.

Figure 13:
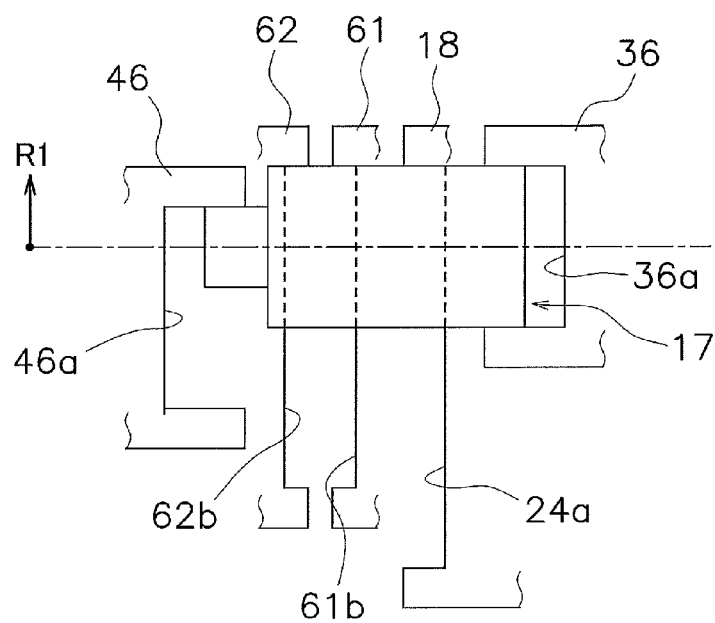
FIG. 13 is a schematic diagram for explaining the series of motions.

It should be noted that when the torsion angle reaches 17 degrees, as shown in FIG. 13, the external teeth 21a of the hub 17 are contacted to the internal teeth 24a of the flange 18. In other words, the hub 17 and the flange 18 are configured to be rotated in synchronization with each other in and after this condition. Therefore, when the torsion angle is greater than or equal to 17 degrees, the first and second low stiffness damper units 5 and 6 are not actuated.

<High Torsion Angular Range: Third Stage Angular Range H3>

When the torsion angle reaches 17 degrees or greater, as shown in FIG. 13, the hub 17 and the flange 18 are unitarily rotated. Hence, relative rotation occurs between the flange 18 and both the clutch plate 11 and the retaining plate 12. Therefore, the high stiffness damper unit 4 is configured to be actuated in a torsion angular range of 17 degrees or greater. At an early stage of this torsion angular range, in the four sets of spring units 4a, the first springs 31 for high stiffness are contacted only at the inner peripheral side parts of the end surfaces thereof to the circumferential end surfaces of the openings 25a of the flange 18. Then, when the torsion angle increases and reaches 19 degrees, the outer peripheral side parts of the first springs 31 are also contacted to the circumferential end surfaces of the openings 25a. In and after this condition, the first springs 31 are configured to be contacted at the entire end surfaces thereof to the circumferential end surfaces of the openings 25a.

As described above, in the third stage angular range H3, apart of each first spring 31 and each second spring 32 are actuated, and the characteristic CH3 is obtained. The characteristic CH3 has the second hysteresis torque HT2, and the stiffness thereof is higher than that of the characteristic CL2 of the second stage angular range L2.

<High Torsion Angular Range: Fourth Stage Angular Range H4>

When the torsion angle reaches 19 degrees or greater, as described above, the first springs 31 are configured to be contacted at the entire end surfaces thereof to the openings 25a of the flange 18. Hence, a stiffness herein obtained is further higher than that of the third stage angular range H3.

As described above, the characteristic CH4 is obtained in the fourth stage angular range H4. The characteristic CH4 has the second hysteresis torque HT2, and the stiffness thereof is higher than that of the third stage angular range H3.

<High Torsion Angular Range: Fifth Stage Angular Range H5>

When the torsion angle increases (and reaches 40.5 degrees) and each pair of the first and second springs 31 and 32 is compressed at a predetermined amount, the end surfaces of the opposed spring sheets 34 are contacted to the both end surfaces of each resin elastic member 33. At and after the angle, each resin elastic member 33 as well as each pair of the first and second springs 31 and 32 is configured to be compressed. Therefore, a stiffness herein obtained is further higher than that of the fourth stage.

Therefore, the characteristic CH5 is obtained in the fifth stage angular range H5. The characteristic CH5 has the second hysteresis torque HT2, and the stiffness thereof is further higher than that of the fourth stage angular range H4.

It should be noted that when the torsion angle further increase, the stopper mechanism 15 is configured to be actuated. In other words, the stopper parts 12c of the retaining plate 12 are contacted to the stopper protrusions 25c of the flange 18, and further relative rotation is prevented in this condition.

[Inhibition of Torsional Vibrations]

In occurrence of large vibrations with large amplitude such as back-and-forth vibrations of a vehicle, a torsional characteristic in the positive-side high torsion angular range and that in the negative-side high torsion angular range are alternately exerted in a repetitive manner. In this case, the back-and-forth vibrations of a vehicle are quickly attenuated by the relatively high second hysteresis torque HT2.

Next, when minute torsional vibrations in idling are inputted into the clutch disc assembly 1, the first and second low stiffness damper units 5 and 6 are configured to be actuated within a low torsion angular range. In this case, noises can be inhibited by implementing a low stiffness and a low hysteresis torque in a wide angular range.

Additionally, the second hysteresis torque HT2 in a traveling range is herein configured to be generated in the higher torsion angular part of the low torsion angular range, i.e., in the higher torsion angular part of the range of a torsional characteristic mainly exerted in idling. Due to this, smooth transition is enabled from the torsional characteristic in the second stage angular range L2 to that in the third stage angular range H3, and thereby, tip-in/tip-out can be improved.

Other Exemplary Embodiments

The present invention is not limited to the aforementioned exemplary embodiment, and a variety of changes or modifications can be made without departing from the scope of the present invention.

(a) In the torsional characteristics, the numeric values of the torsion angles in the respective stages are exemplary only. Hence, the numeric values in the present invention are not limited to the above. Additionally, the number of the low torsion angular stages and that of the high torsion angular stages are similarly not limited to those in the present exemplary embodiment.

(b) In the aforementioned exemplary embodiment, a part of each external tooth 21a of the hub 17, with which the second low stiffness damper unit 6 is meshed, is constructed to have a small width in order to cause the second low stiffness damper unit 6 to be actuated from the second stage angular range L2. However, the aforementioned part of each external tooth 21a of the hub 17 may be constructed to have the same width as the other part thereof, and each internal tooth 46a of the second drive plate 46 of the second low stiffness damper unit 6 may be constructed to have a large width.

(c) In the aforementioned exemplary embodiment, the intermediate hysteresis torque HTm higher than the first hysteresis torque HT1 is configured to be generated in a part of the second stage angular range L2. However, the first hysteresis torque HT1 may be configured to be generated in the part of the second stage angular range L2 as it is generated in the first stage angular range L1.

INDUSTRIAL APPLICABILITY

In the damper disc assembly of the present invention, noises in idling and vibrations can be attenuated by widening the low torsion angular range as much as possible, and simultaneously, a high torque can be obtained in idling corresponding to the low torsion angular range.

REFERENCE SIGNS LIST

1 Clutch disc assembly
2 Input-side plate
3 Output unit
4 High stiffness damper unit
5 First low stiffness damper unit
6 Second low stiffness damper unit
7 First hysteresis torque generating mechanism 8 Second hysteresis torque generating mechanism
11 Clutch plate
12 Retaining plate
17 Hub
18 Flange
35, 45 Holder plate
36, 46 Drive plate
37, 47 Low stiffness spring

The invention claimed is:

1. A damper disc assembly for attenuating variation in torque inputted thereto from an engine and for transmitting the torque toward a transmission, comprising:

first and second input plates to which the torque is inputted from the engine, the first and second input plates disposed axially in opposition to each other, the first and second input plates fixed to each other;

an output unit including an input-side member and an output-side member, the input-side member and the output-side member disposed rotatably relative to the first and second input plates, the input-side member and the output-side member disposed rotatably relative to each other, the input-side member disposed axially between the first and second input plates, the output-side member coupleable to the transmission;

a high stiffness damper unit elastically coupling the input-side member and the first and second input plates in a rotational direction, the high stiffness damper unit configured to be actuated in a high torsion angular range of torsional characteristics;

a first low stiffness damper unit elastically coupling the input-side member and the output-side member in the rotational direction, the first low stiffness damper unit disposed axially between the first input plate and the input-side member on an inner peripheral side of the high stiffness damper unit, the first low stiffness damper unit configured to be actuated in a low torsion angular range of the torsional characteristics, the first low stiffness damper unit having a lower stiffness than the high stiffness damper unit;

a second low stiffness damper unit elastically coupling the input-side member and the output-side member in the rotational direction, the second low stiffness damper unit disposed axially between the second input plate and the input-side member on the inner peripheral side of the high stiffness damper unit, the second low stiffness damper unit configured to be actuated later than actuation of the first low stiffness damper unit in the low torsion angular range of the torsional characteristics, the second low stiffness damper unit having a lower stiffness than the high stiffness damper unit; and a first hysteresis torque generating mechanism configured to generate a first hysteresis torque in an actuation range of the first low stiffness damper unit.

2. The damper disc assembly recited in claim 1, wherein the output-side member is a hub coupleable to the transmission, and the input-side member is a flange radially extending on an outer peripheral side of the hub, the flange rotatable relatively to the hub within a predetermined angular range.

3. The damper disc assembly recited in claim 2, wherein the each of the first and second low stiffness damper units includes a pair of holder plates engaged with the flange whereby the torque is inputted thereto from the flange, a drive plate disposed axially between the pair of holder plates, the drive plate engaged with the hub whereby the torque is outputted therefrom to the hub, and an elastic member elastically coupling the drive plate and the pair of holder plates in the rotational direction.

4. The damper disc assembly recited in claim 1, further comprising:

a second hysteresis torque generating mechanism configured to generate a second hysteresis torque higher than the first hysteresis torque in a higher torsion angular part of an actuation range of the second low stiffness damper unit, wherein the first hysteresis torque generating mechanism is further configured to generate the first hysteresis torque in a lower torsion angular part of the actuation range of the second low stiffness damper unit.

5. The damper disc assembly recited in claim 4, wherein the second hysteresis torque generating mechanism is further configured to generate the second hysteresis torque in the actuation range of the high stiffness damper unit.

6. The damper disc assembly recited in claim 4, further comprising:

an intermediate hysteresis torque generating mechanism configured to generate an intermediate hysteresis torque in the lower torsion angular part of the actuation range of the second low stiffness damper unit, the intermediate hysteresis torque higher than the first hysteresis torque and lower than the second hysteresis torque.

* * * * *